No. 750,571. PATENTED JAN. 26, 1904.
C. L. BERGER.
PNEUMATIC SEAT.
APPLICATION FILED AUG. 18, 1902.
NO MODEL.
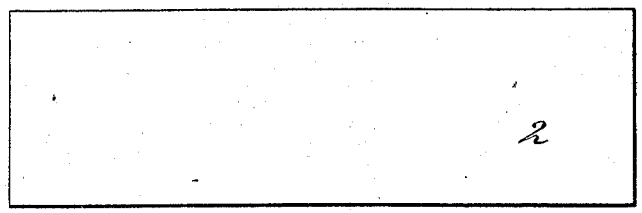
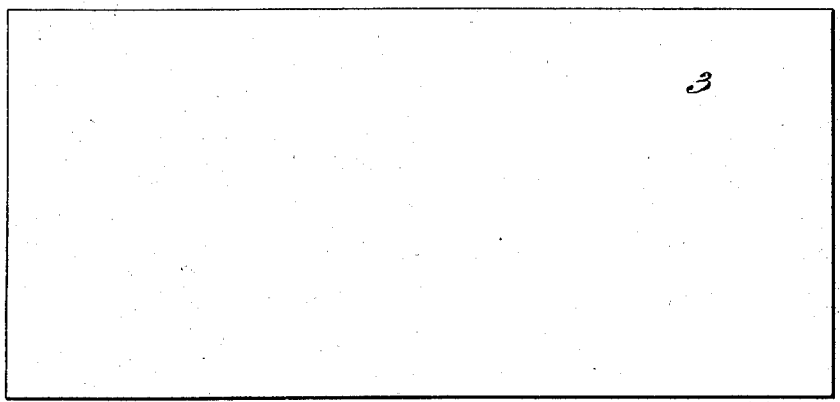
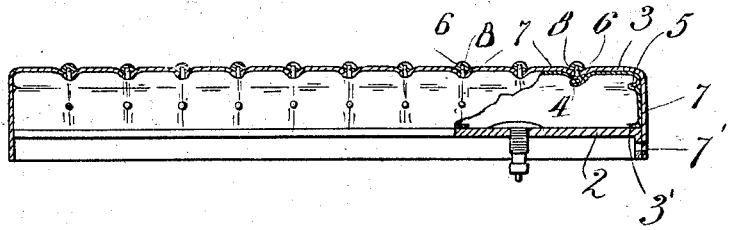
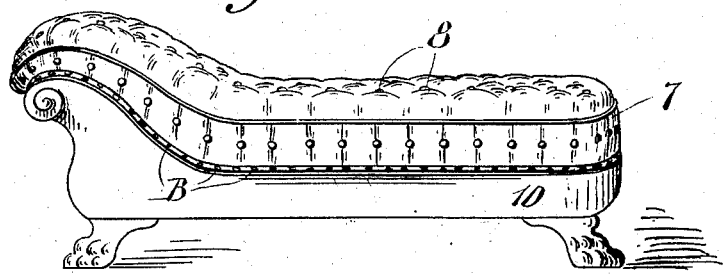
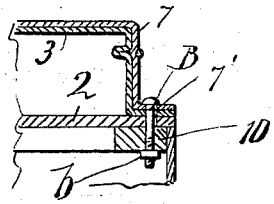
WITNESSES: INVENTOR
Edgar A. Monforts C. L. Berger
B. Patterson BY
Clay Deimer
ATTORNEYS
THE NORRIS PETERS CO., PHOTO-LITHO., WASHINGTON, D. C.

No. 750,571. Patented January 26, 1904.

UNITED STATES PATENT OFFICE.

CHARLES LOUIS BERGER, OF RICHMOND, INDIANA, ASSIGNOR OF ONE-HALF TO RAY MORROW, OF MINNEAPOLIS, MINNESOTA.

PNEUMATIC SEAT.

SPECIFICATION forming part of Letters Patent No. 750,571, dated January 26, 1904.

Application filed August 18, 1902. Serial No. 119,995. (No model.)

*To all whom it may concern:*

Be it known that I, CHARLES LOUIS BERGER, a citizen of the United States, and a resident of Richmond, county of Wayne, and State of Indiana, have invented certain new and useful Improvements in Pneumatic Seats, of which the following is a specification, reference being had to the accompanying drawings, forming a part thereof, in which similar characters of reference indicate corresponding parts.

This invention relates to pneumatic seats and to a method of forming the same, the object being to form and provide a seat which when inflated will assume substantially the form of the ordinary seating-surface. In forming such a pneumatic seat I prefer to vulcanize together two sheets of rubber of different sizes to form an air-tight inflatable body, one of these sheets being, preferably, longer, wider, and thinner than the other in order that it may be shaped to form the top, sides, and ends of the seat. At suitable points therein this large sheet of rubber may be folded over and the folds vulcanized to form an irregular or undulating seating-surface, as is usual in making the seats of sofas, &c. After this has been done the seat may be provided with a cloth, leather, or other suitable wearing-surface, which may be fastened to the rubber surface of the seat, as by means of pins vulcanized to the rubber sheet at the points where the latter is folded over, these pins being passed through openings in the cloth or leather wearing-surface and having heads, preferably rubber, applied or vulcanized thereto.

In the drawings, Figure 1 is a plan of a rubber sheet or blank for forming the under side of the inflatable body portion of the seat. Fig. 2 is a similar view of a rubber sheet or blank for forming the top, sides, and ends of such body portion. Fig. 3 is a longitudinal section of a completed pneumatic sofa-body ready to be secured to the frame of a sofa. Fig. 4 illustrates a complete sofa having a pneumatic body formed in accordance with this invention. Fig. 5 is a detailed vertical sectional elevation illustrating the mode of fastening the device to a frame.

In carrying out the present process of forming a seat having a pneumatic body portion I prefer to take two substantially oblong sheets of rubber, such as 2 and 3, the sheet 2 being considerably shorter and narrower than sheet 3, but much thicker. Sheet 2 is intended to form the bottom portion of the pneumatic body of the seat, all the other walls of such body portion being formed by sheet 3. At suitable points therein sheet 3 will be folded under and the folds vulcanized together, the manner in which the upper surface of the pneumatic body portion is folded being shown at 4, while the mode of folding the ends and sides before vulcanization is illustrated at 5. It will be noticed that at the point 4 three plies or thickness of the rubber sheet are vulcanized together, and hence a backing of considerable thickness is provided to which can be secured by vulcanization a pin 6, which may be made of rubber and may be passed through an opening in a wearing-surface of cloth, leather, or other suitable material 7 for holding such covering in place. A button 8, usually of rubber, may be vulcanized to the pin 6 to hold the covering firmly in place on the rubber surface.

The two sheets 2 and 3 may be secured together at their edge parts by vulcanization, as shown at 3', the union of the two forming an air-tight joint all around.

As a means for fastening the cushion, apertures 7' are formed through the vulcanized edge and through the covering 7. These apertures have bolts B, which pass through the seat-frame 10 and are secured by nuts $b$, thus providing an efficient and durable structure.

For the purpose of inflating the pneumatic body portion or seat formed in the manner just described I provide at some suitable point a valve, such as $v$, through which air may be pumped in a manner which is well understood until the pneumatic seat is filled out sufficiently, when the pump can be disconnected and the cap 12 of the valve supplied.

I do not confine myself to the specific mechanical details as herein shown and described, as it is obvious that under the scope of my invention I am entitled to structural variations suitable to different styles of furniture and to variations of means for securing the cushion to the furniture-frame.

Having thus described my invention, what I claim as new, and desire to secure by Letters Patent, is—

1. The combination with a frame, of a pneumatic rubber seat having vulcanized folds at various points in the seat portion thereof, and a covering secured to said vulcanized folded portions and to the frame.

2. The combination with a frame, of a pneumatic rubber seat having vulcanized folds at various points in the seat portion thereof, pins vulcanized to said vulcanized folded portions, a covering secured to the frame and having openings through which said pins pass, and buttons vulcanized to the outer ends of said pins.

3. The combination with a frame, of a rubber sheet, a second rubber sheet of larger size vulcanized at its edges to the inner side of said first sheet and forming therewith a pneumatic seat and having vulcanized folds at various points therein, and a covering secured to said vulcanized folded portions and to the frame.

In testimony that I claim the foregoing as my invention I have signed my name, in presence of two witnesses, this 20th day of May, 1902.

CHARLES LOUIS BERGER.

Witnesses:
WILLIAM B. MARTIN,
CLIFFORD HUTCHINS.